United States Patent Office 2,850,513
Patented Sept. 2, 1958

2,850,513

PREPARATION OF ORGANIC LEAD COMPOUNDS

Herman Pines, Chicago, Ill., assignor to Universal Oil Products Company, Des Plaines, Ill., a corporation of Delaware No Drawing. Application June 11, 1953
Serial No. 361,081

13 Claims. (Cl. 260—437)

This invention relates to a process for the preparation of organo lead compounds, and more particularly to a process for preparing alkyl lead compounds such as tetraethyllead.

It is an object of this invention to provide an improved process for preparing organo lead compounds.

Another object of the invention is to prepare organo lead compounds by using olefinic hydrocarbons as starting materials in the process.

A still further object of this invention is to prepare alkyl lead compounds such as tetraethyllead by using olefinic hydrocarbons as starting materials in the process.

In one embodiment the invention resides in the preparation of organo lead compounds by reacting an olefinic hydrocarbon with a composition consisting of lead and an alkali metal in the presence of hydrogen to form the desired organo lead compounds.

A more specific embodiment of this invention resides in the preparation of alkyl lead compounds by reacting an olefinic hydrocarbon with a lead-sodium alloy in the presence of hydrogen to prepare an alkyl lead compound.

A still more specific embodiment of this invention resides in the preparation of tetraethyllead by reacting an olefinic hydrocarbon such as ethylene with a lead-sodium alloy in the presence of hydrogen and at elevated temperatures to form tetraethyllead.

Other objects and embodiments of the present invention referring to alternative olefinic hydrocarbons which may be used as a feed stock and to alternative compositions of lead and an alkali metal within the scope of this invention will be referred to in the following further description.

Heretofore, the usual commercial preparation of alkyl lead compounds and in particular, tetraethyllead, has been to react an alkyl halide such as ethyl chloride with a lead-sodium alloy to convert the aforesaid ethyl chloride to tetraethyllead. Other processes of preparing alkyl lead compounds involve the Grignard reaction in which lead chloride is reacted with a Grignard reagent such as ethyl magnesium chloride. Still other methods of preparing alkyl lead compounds involve reactions between an alkyl halide and the free metal lead in the presence of another metal such as magnesium and a catalyst or by reacting an alkyl halide with a three component alloy such as lead-magnesium-sodium. As is known in the art, the manufacture of tetraethyllead is important due to its wide-spread use in the automotive industry as an anti-knock additive to gasoline.

As hereinbefore stated, the present process involves the reaction between an olefinic hydrocarbon and a composition consisting of lead and an alkali metal. This metallic composition may be in the form of an alloy or a hydride. Thus, the alloys may comprise lead-sodium, lead-potassium, lead-lithium, lead-rubidium and lead-cesium. The hydrides would correspond to the alloys consisting therefor of lead-lithium hydride, sodium-lead hydride, potassium-lead hydride etc. It is also possible in this reaction to use mixtures of hydrides such as lead hydride and sodium hydride, lead hydride and potassium hydride, lead hydride and lithium hydride, etc.

Olefinic hydrocarbons which may be used as starting material in the production of organo lead compounds include aliphatic olefins such as ethylene, propylene, butylene, amylene, etc., cyclic olefins including cyclopentene, cyclohexene, cycloheptene, etc. substituted furans, thiophenes and pyrroles such as ethylene furan, propylene furan, etc., ethylene thiophene, propylene thiophene, butylene thiophene, etc., ethylene pyrrole, propylene pyrrole, butylene pyrrole, etc. Alkenyl substituted cyclic hydrocarbons such as vinyl cyclopentyl, allyl cyclopentyl, etc., vinyl cyclohexyl, allyl cyclohexyl, 1 cyclohexyl-1-butene, etc., vinyl cycloheptyl, allyl cycloheptyl, etc., as well as alkenyl aromatics such as styrene, phenyl propylene, phenyl butylene, etc. may also be used as the olefinic hydrocarbon comprising the starting material of this process.

The temperature under which the reaction will proceed is dependent upon the type of olefin used as a starting material in the process. Temperatures of from about 50° C. to about 200° C. or more may be used, the preferred range being from about 50° C. to about 150° C. or more. The reaction also will be carried out under a super atmospheric pressure of hydrogen, the pressures ranging from about atmospheric to about 50 atmospheres or more, the preferred range being from about 10 atmospheres to about 30 atmospheres.

Although this process may be used to prepare various organo lead compounds a specific use is found in the preparation of lead alkyl compounds and more particularly in the preparation of tetraethyllead. The preparation of tetraethyllead using ethylene and an alloy comprising lead and sodium would take place according to the following equation:

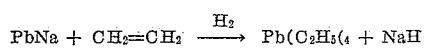

$$PbNa + CH_2=CH_2 \xrightarrow{H_2} Pb(C_2H_5)_4 + NaH$$

It is believed that the ethylene first reacts with sodium hydride formed by the reaction between the sodium and the hydrogen admitted under pressure. The sodium hydride would add to the olefinic double bond thereby forming sodium ethyl, after which the sodium ethyl would then react with the lead to form tetraethyllead.

The process of this invention may be effected in any suitable manner and may be either a batch or continuous type operation. When a batch type operation is used, a quantity of the starting materials, namely, the composition comprising lead and an alkali metal, for example, a lead-sodium alloy is placed in a suitable reaction vessel such as an autoclave which is equipped with gas introducing means. The vessel is then closed and sealed, after which the olefinic hydrocarbon such as ethylene is introduced through one line while hydrogen gas is admitted into the vessel through another line. The reaction vessel is then heated to the desired temperature while the addition of hydrogen gas is continued. After a suitable time has elapsed, the reactor and its contents are cooled to room temperature, the pressure reduced and the desired product, which in this case is tetraethyllead is recovered by conventional means, for example, by fractional distillation.

Another method of operation in the present process is of the continuous type. A particularly suitable type of operation comprises a fixed bed type in which the alloy or hydride is disposed as a bed in the reaction zone provided with gas introducing means while olefinic hydrocarbons such as ethylene pass therethrough in either an upward or downward flow at the same time that hydrogen is being introduced into the vessel. The alkylation of the lead will continue until a desired time has elapsed, after which the tetraethyllead will be withdrawn from the reaction zone while the unreacted olefinic hydrocarbon, which in this case is ethylene, will be recycled for use as a portion of a starting material.

Another continuous type process is the fluidized type operation in which the alloy or hydride and the olefinic hydrocarbon are maintained in a state of turbulence under hindered settling conditions in the reaction zone while the reaction proceeds. Another continuous type of process includes the compact moving bed type of operation in which the olefinic hydrocarbon and the lead-alkali metal alloy or hydride pass either currently or countercurrently to each other. Still another type of continuous process is the slurry type process in which the alloy or hydride is carried into the reaction zone as a slurry in the olefinic hydrocarbon. This process may only be used when the olefinic hydrocarbon which is used as the alkylating agent is in liquid form. In each of the aforementioned type of processes the unreacted olefinic hydrocarbon may be separated out and recycled for use as a portion of the feed material while the desired product is withdrawn and purified.

The following examples are given to illustrate the process of the invention, which, however, are not intended to limit the generally broad scope of the present invention in strict accordance therewith.

*Example I*

A quantity of sodium-lead alloy is placed in a sealed vessel provided with mixing means and inlet means. The vessel is sealed and a stream of ethylene gas is admitted thereto. While the vessel is being heated to the desired temperature a stream of hydrogen gas is introduced into the vessel until a pressure of approximately 10 atmospheres is reached. Heating is continued until a temperature of approximately 100° C. is reached and maintained at the aforementioned pressure and temperature for a period of about 4 hours. The alloy in the form of particles is agitated during the reaction process. At the end of the 4 hours the vessel and the contents thereof are cooled to room temperature, after which the product comprising tetraethyllead is removed from the unreacted components of the reaction mixture by distillation.

*Example II*

A quantity of potassium lead alloy is placed in a reaction vessel similar to that described in Example I. A stream of propylene gas is introduced into the vessel through one of the gas inlet means while a stream of hydrogen is introduced into the vessel through the other. Heat is applied until a temperature of approximately 100° C. is reached at the same time building up a pressure of approximately 10 atmospheres. Heating and agitating is continued for a period of aproximately 8 hours after which the vessel and the contents thereof is cooled to room temperature. The reaction product, namely, tetraethyllead, is removed and purified by fractional distillation.

*Example III*

A quantity of lead lithium hydride and a quantity of styrene are placed in a reaction vessel provided with mixing and gas inlet means. The vessel is sealed and heated to a temperature of approximately 120° C. while hydrogen gas is introduced thereto until a pressure of 15 atmospheres has been reached. The reaction mixture is heated and mixed for a period of approximately 10 hours after which time the vessel and contents thereof is cooled to room temperature. The reaction product comprising tetraethylbenzene lead is recovered from the contents of the vessel by fractional distillation.

I claim as my invention:

1. A process for the preparation of an organo lead compound which comprises reacting an olefinic hydrocarbon with a composition selected from the group consisting of alloys and hydrides comprising lead and an alkali metal in the presence of hydrogen.

2. A process for the preparation of an organo lead compound which comprises reacting an olefinic hydrocarbon with an alloy comprising lead and an alkali metal in the presence of hydrogen.

3. A process for the preparation of an organo lead compound which comprises reacting an olefinic hydrocarbon with an alloy comprising lead and sodium in the presence of hydrogen.

4. A process for the preparation of a lead alkyl compound which comprises reacting an aliphatic olefinic hydrocarbon with an alloy comprising lithium and lead in the presence of hydrogen.

5. A process for the preparation of a lead alkyl compound which comprises reacting an aliphatic olefinic hydrocarbon with an alloy comprising lead and sodium in the presence of hydrogen.

6. A process for the preparation of a lead alkyl compound which comprises reacting an aliphatic olefinic hydrocarbon with a lead-alkali metal hydride in the presence of hydrogen.

7. A process for the preparation of a lead alkyl compound which comprises reacting an aliphatic olefinic hydrocarbon with a lead-sodium hydride in the presence of hydrogen.

8. A process for the preparation of lead tetraethyl which comprises reacting ethylene with a lead-sodium alloy in the presence of hydrogen at elevated temperatures.

9. A process for the preparation of lead tetrapropyl which comprises reacting propylene with a lead-sodium alloy in the presence of hydrogen at elevated temperatures.

10. A process for the preparation of an organo lead compound which comprises reacting an aliphatic mono-olefin having a terminal double bond with a composition selected from the group consisting of alloys and hydrides comprising lead and an alkali metal in the presence of hydrogen.

11. A process for the preparation of an organo lead compound which comprises reacting an aliphatic mono-olefin having a terminal double bond with an alloy comprising lead and an alkali metal in the presence of hydrogen.

12. A process for the preparation of an organo lead compound which comprises reacting a composition selected from the group consisting of alloys and hydrides comprising lead and an alkali metal, in the presence of hydrogen, with an olefinic compound having an aliphatic mono-olefinic hydrocarbon chain in which the double bond is in a terminal position.

13. The process of claim 12 further characterized in that said composition is an alloy of lead and alkali metal.

References Cited in the file of this patent
UNITED STATES PATENTS
2,087,656     Rice _____ July 20, 1937